United States Patent [19]

Liu

[11] Patent Number: 5,524,626

[45] Date of Patent: Jun. 11, 1996

[54] SYSTEM AND METHOD FOR DETERMINING LOCAL ATTENUATION FOR ULTRASONIC IMAGING

[75] Inventor: Dong-Chyuan Liu, Mercer Island, Wash.

[73] Assignee: Siemens Medical Systems, Inc., Iselin, N.J.

[21] Appl. No.: 497,342

[22] Filed: Jun. 30, 1995

[51] Int. Cl.$^6$ ........................................ A61B 8/00
[52] U.S. Cl. ........................ 128/660.06; 73/599
[58] Field of Search ............... 128/660.06, 660.07, 128/660.08, 661.01, 661.02; 73/596, 597, 599; 364/413.25

[56] References Cited

U.S. PATENT DOCUMENTS

| | | | |
|---|---|---|---|
| 4,441,368 | 4/1984 | Flax | 73/599 |
| 4,855,911 | 8/1989 | Lele et al. | 364/413.25 |
| 4,993,416 | 2/1991 | Ophir | 128/660.06 |

*Primary Examiner*—George Manuel
*Attorney, Agent, or Firm*—Jeffrey Slusher

[57] ABSTRACT

Power values of backscattered ultrasonic echoes from an interrogation region of a patient's body are stored in a 2-D envelope table. The region is thereby represented as a 2-D pattern of image elements. In a processing mode, these elements are grouped into processing windows. After row averaging of the power values for each window, a window attenuation coefficient is generated corresponding to a decay parameter of a non-linear decay model of local attenuation of the interrogation region as a non-linear function of the average positional power values for each row in the processing window. The coefficients are then used to scale the power values before scan conversion and display, and thus to compensate for local attenuation. The invention can also test for tissue heterogeneity by first defining convergence and non-convergence criteria. A rationalized gain control processor then iteratively estimates the window attenuation coefficients until either criterion is met. The RGC processor then indicates heterogeneity of tissue in the corresponding processing window of the interrogation when the non-convergence criterion is met.

8 Claims, 4 Drawing Sheets

SYSTEM AND METHOD FOR DETERMINING LOCAL ATTENUATION FOR ULTRASONIC IMAGING

BACKGROUND OF THE INVENTION

1. Field of the Invention

This invention involves a system and a method for determining local attenuation for ultrasonic imaging and in particular for rationalized gain control of ultrasonic images, especially those obtained by ultrasonic imaging of a region of a patient's body.

2. Description of the Related Art

Ultrasonic imaging of a body typically involves sending one or more ultrasonic signals into a region of a body and then sensing the relative strength of the signals returned as echoes from various portions of the region. All else being equal, signals return most strongly from portions of the region where the local change in acoustic impedance is greatest. The relative strengths of the return signals are then converted and processed and displayed in some form, for example, on a monitor, that represents an image of the scanned region.

The problem is, all other things are not equal. In the context of medical ultrasonic imaging, for example, several centimeters of tissue will often lie between the ultrasonic transducer and the region to be imaged. This tissue will typically greatly weaken (attenuate) the ultrasonic signals, in both directions, and may cause a return signal to appear weak even though it actually is an echo from an acoustically strongly reflecting region. Moreover, the problem is made worse if the tissue is not homogeneous; for example, a blood vessel may lie in the path of some of the ultrasonic signals but not of others. If one does not compensate for this uneven attenuation, the system might indicate structure in the region of interest when there is none, or fail to indicate structure of interest that is in the acoustic "shadow" of a non-homogeneous region between it and the transducer.

Yet another problem caused by attenuation is that the pulse-echo ultrasound signals have a large dynamic range. This makes them unsuitable for direct display on most conventional monitor screens, whose own dynamic range is normally too small.

One known way of dealing with the problem of attenuation is "time gain control" (TGC), in which the user manually enters a gain-versus-depth profile. The idea behind this method is that if one knows how deep (far from the transducer) the region of interest lies, and if one knows at least approximately the attenuation coefficients for the interrogated tissue and also the scanning geometry, for example, the focusing of the system, then one can employ time-gating techniques to compensate signals that arrive from different parts of the examined area. The gain can therefore be adjusted according to the depth of the region of interest.

One disadvantage of this known method is that an image frame is built up from several scanning beams, and the same gain profile is used for every scanning beam in the frame. Since the gain compensation cannot change from one beam to the next, this method can only match the proper attenuation profiles over a small number of beams. Variations in the geometry of the tissue over the field of view can therefore cause errors in the attenuation correction.

Because of the shortcomings of conventional, manual TGC, several other methods for rationalized gain control (RGC) have been proposed. In this context, "rationalized" means that the gain control depends on and is derived from the image itself rather than from a user-entered time relationship. Some of these determine a compensating gain function from an analysis of the echo intensities or the amplitude distribution of the picture elements ("pixels") in the image. In these methods, the gain compensation is thus indirect and does not result from a direct estimate of the attenuation. As such, they have unavoidable inaccuracies that degrade the ultimate image. Such methods are described in:

"Adaptive Time Gain Compensation for Ultrasonic Imaging," Ultrasound in Medicine and Biology, Vol. 18, No. 2, pp. 205-12, 1992, S. D. Pye, S. R. Wild, and W. N. McDicken;

"Ultrasonic Tissue Characterization Using Kurtosis," IEEE Trans. UFFC, Vol. 33, No. 3, pp. 273-79, 1986, R. Kuc; and "Quantitative volume Backscatter Imaging," IEEE Trans. Sonics & Ultrasonics, Vol. 30, No. 1, pp. 26-36, M. O'Donnell.

In "Rational Gain Compensation for Attenuation in Cardiac Ultrasonography," Ultrasonic Imaging, Vol. 5, pp. 214-28, 1983, H. E. Melton, Jr., and D. J. Skorton derived a rationalized gain function based on a model of the diffraction, attenuation at the center frequency, and the frequency-dependent attenuation for cardiac ultrasonography. In this method, attenuation coefficients are approximated from the known attenuation of myocardium and blood through a detection circuit. The disadvantage of this method is that it's accuracy is limited to particular types of tested tissue.

A method for estimating attenuation as applied to TGC is described in "Application of stochastic analysis to ultrasonic echoes—Estimation of attenuation and tissue heterogeneity from peaks of echo envelope," J. Acoust. Soc. Amer., Vol. 79(2), pp. 526-34, 1986, P. He and J. F. Greenleaf. According to this method, the attenuation is computed from envelope peaks of each amplitude or "A" line by finding a minimum of a noise-to-signal ratio. Later, in "Acoustic attenuation estimation for soft tissue from ultrasound echo envelope peaks," IEEE Trans. Ultra. Ferroelec. Freq. Control, Vol. 36, No. 2, pp. 197–203, 1989, P. He proposed a split-spectrum processing method using the envelope peaks to estimate the attenuation in a broadband system. One reason to use split-spectrum processing is that it is equivalent to assuming a narrowband system and thereby to avoid the effect of frequency downshift found in a broadband system.

As its name implies, "frequency downshift" is the phenomenon that the return frequency spectrum of a broadband ultrasonic signal is shifted toward d.c. as it passes through the scanned tissue. This shift is non-linear, and failure to take it into account naturally causes inaccuracies in representation of the acoustic properties of the scanned region, that is, in the displayed image.

In "Attenuation measurement uncertainties caused by speckle statistics," J. Acoustic Soc. Amer., Vol. 80, pp. 727-34, 1986, K. J. Parker presented yet another method for estimating attenuation from decomposed radio-frequency signals using the Fast Fourier Transform (FFT). Attenuation is computed from a linear least-squares fit taken at the center frequency bin and then the values are averaged to reduce the variance of the computed attenuation coefficients. This decomposition process also acts as a narrowband system so that the linear least-squares model would be valid. As with many other known systems, this method in a sense makes the system fit the model rather than the other way around and, as a result, it introduces unavoidable inaccuracies.

Still another method for estimating attenuation is described in "Estimation of local attenuation from multiple views using compensated video signals," Acustica, Vol. 79, pp. 251–58, 1993, K. J. Peters, R. C. Waag, D. Dalecki and J. G. Mottley. In this method, one assumes a narrowband system and then estimates the local attenuation using envelope data. Even though this method assumes a narrowband system, the reference also discusses the effects of frequency downshift. To deal with this problem according to this method, one first estimates the attenuation without including the effects of downshift (by using linear least-squares data fitting to the decay model) and then updates the estimate by compensating for the attenuation-induced downshift. Nonetheless, this method attempts to model a non-linear system starting with a narrowband, linear assumption.

Yet another disadvantage of conventional systems is that they do not provide a measure of how accurate the local model is, in part because they do not provide a measurement of how heterogeneous the scanned tissue is. This means in turn that the user has no idea of how confident she can be in the results of the gain control.

In some applications, such as tissue studies, what is needed is a system and a method for accurately determining just what the local (that is, position-dependent) attenuation characteristics of the scanned region are. In other applications, what is needed is a system and a method that allow the user to control the gain by a direct estimation of the attenuation; the method and system should ideally not be restricted to being narrowband, and should preferably also provide a measure of tissue homogeneity.

SUMMARY OF THE INVENTION

The invention provides method and a system for determining local attenuation of an interrogation region scanned by an ultrasonic imaging system in which an interrogation region is first scanned using an ultrasonic transducer in an axial direction and a lateral direction. Backscattered ultrasonic echoes are then sensed and grouped by a reception processor as a two-dimensional pattern of image elements, which also generates a two-dimensional table of envelope power values corresponding to a plurality of rows and columns of the pattern of image elements.

In a processing mode the image elements in the interrogation region are grouped into a two-dimensional pattern of processing windows, each window being divided into window rows that extend in the lateral direction and window columns that extend in the axial direction. For each window row of each processing window, an average positional power value is generated by an RGC processor. The RGC processor then generates a window attenuation coefficient corresponding to a decay parameter of a non-linear decay model of local attenuation of the interrogation region as a non-linear function of the average positional power values for each row in the processing window. The attenuation coefficients are then stored in memory.

For applications in which the local attenuation is also to be controlled, the RGC processor, or an image processor, further scales each envelope power value by a run-time attenuation value that is a predetermined function of the window attenuation coefficient for the corresponding processing window. After conventional scan conversion, the scaled envelope power values are displayed on a conventional display device.

In one embodiment of the invention, the window attenuation coefficients are generated and stored in an attenuation table portion of a memory during the processing mode, but scaling is carried out in an idle mode, during which the stored attenuation coefficients are applied to run-time scanned power values of different scanned images of the interrogation region.

In order to increase resolution, the processing windows preferably overlap in the axial direction.

The invention also makes it possible to test for tissue heterogeneity by first defining a convergence criterion and a non-convergence criterion. The RGC processor then iteratively estimates the window attenuation coefficient until either criterion is met. The RGC processor then indicates heterogeneity of tissue in the corresponding processing window of the interrogation when the nonconvergence criterion is met.

DETAILED DESCRIPTION

The invention is described below primarily with reference to its use in actual control of the local attenuation, that is, for rationalized gain control (RGC). The invention is also advantageous, however, for solving the "included" problem of estimating local attenuation characteristics without subsequent application for image improvement.

Figure 1:
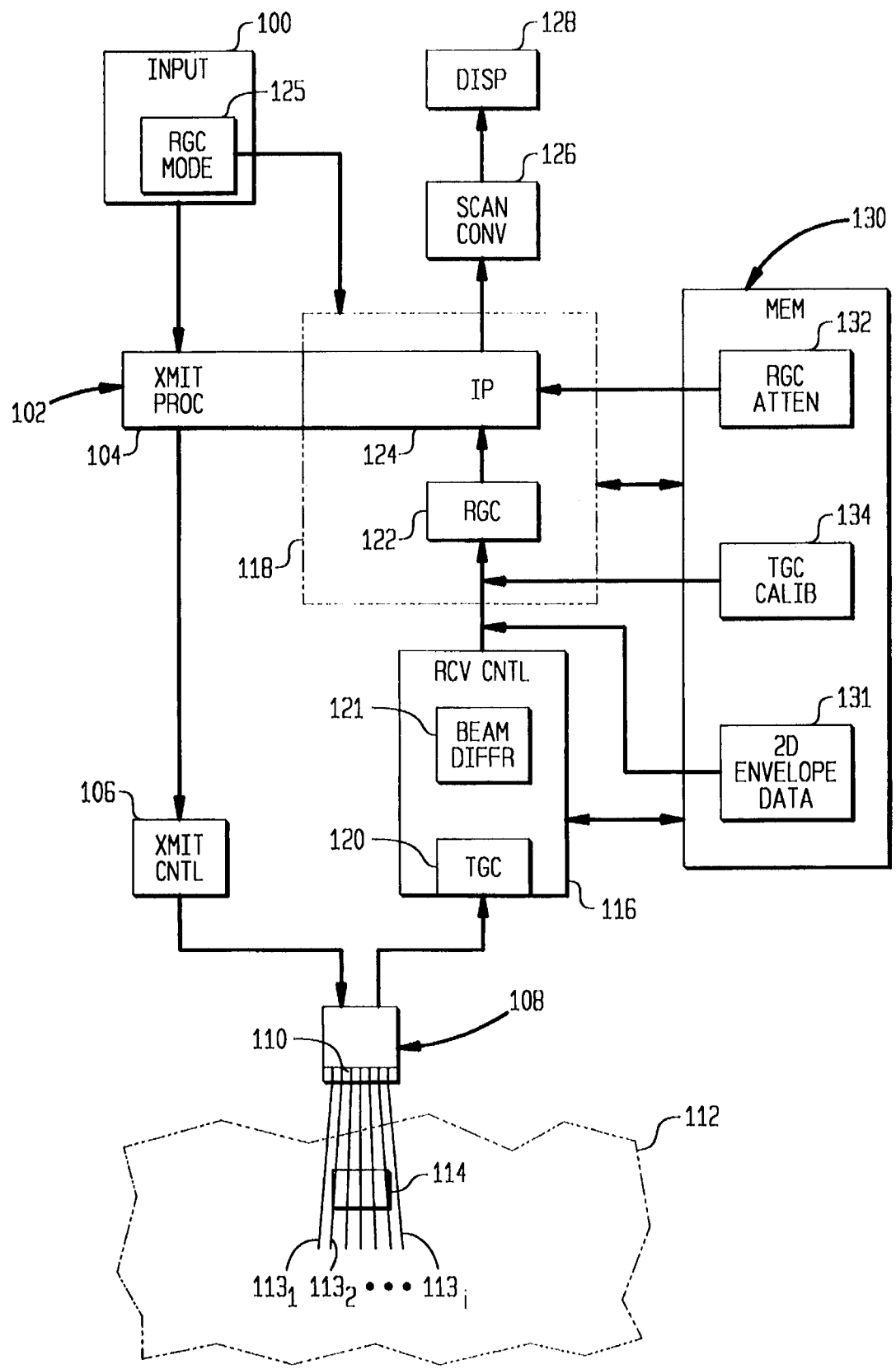
FIG. 1 is a block diagram of an ultrasound imaging system that includes the rationalized gain control (RGC) system according to the invention.

FIG. 1 illustrates the main components of an ultrasonic imaging system according to the invention. The user enters the various conventional scan parameters into an input unit 100, which typically includes such devices as a keyboard, knobs, and buttons. The input unit is connected to a processing system 102, which includes transmission processing circuitry 104. The processing system will typically be an electrically connected and cooperating group of processors such as microprocessors and digital signal processors, but the system may also be implemented by a single processor as long as it is fast enough to handle the various tasks described below.

The transmission processing circuitry 104 sets, adjusts, and monitors the operating parameters of a conventional transmission control circuit 106, which generates and applies electrical control and driving signals to an ultrasonic probe 108, which includes an array 110 of piezoelectric elements. As is well known in the art, the piezoelectric elements generate ultrasonic waves when electrical signals of the proper frequency are applied to them.

By placing the probe 108 against the body of a patient, these ultrasonic waves enter a portion 112 of the patient's body. By varying the phasing, amplitude, and timing of the driving signals, the ultrasonic waves are focussed to form a series of scan lines or planes $113_1$, $113_2$, ..., $113_i$ that typically fan out from the probe. Several such scan lines are shown extending into the patient's body in FIG. 1. A region of interest, that is, the region that the user want to have an image of, is shown as an interrogation region 114. The manner in which ultrasonic scanning signals are controlled, generated, and applied to a patient's body is well understood in the art and is therefore not described further. Of importance to the invention is that the interrogation region 114 is scanned using a series of substantially adjacent scan lines that extend over a known depth.

Ultrasonic echoes from the waves transmitted into the body return to the array 110. As is well understood, the piezoelectric elements in the array thereby convert the small mechanical vibrations of the echoes into corresponding electrical signals. Amplification and other conventional signal conditioning and processing is then applied to the return signals by a reception controller 116. This processing includes time-gating and elevation and azimuth detection in order to identify the echo signals that correspond to the interrogation region 114.

The reception controller 116 converts the ultrasonic, radio-frequency (RF) return signals (typically on the order of a few to tens of megahertz) into lower frequency ranges for processing, and may also include analog-to-digital conversion circuitry (which may alternatively be included in the processing system 102). This is well known in the art of ultrasonic imaging. The reception controller 116 preferably also includes conventional circuitry for providing TGC (circuit 120) and beam diffraction compensation (circuit 121). The down-converted power values for the two-dimensional interrogation region are stored in memory as two-dimensional envelope data.

It is well known that, as the ultrasonic signals propagate into the patient's body, they tend to spread out. This "beam diffraction" is associated with transmission focussing and angle dependency and causes changes in intensity that are unrelated to changes in acoustic impedance; in particular, it causes areas of "false darkness" in the interrogation region. According to the invention, conventional pre-processing, such as using a diffraction grating or software-based diffraction compensation, is preferably carried out by the beam diffraction circuit 121 before applying the gain control features of the invention. Software-based diffraction compensation may, for example, involve the compilation of correction tables based on experimental data for either transmission focussing, reception focussing, or, preferably, both. This pre-processing may, for example, be included in circuitry other than the reception controller 116, or it may be included as a separate circuit such as a dedicated processor, as long as it is carried out before the RGC procedures according to the invention.

The received signals are then applied to an RGC and beamforming system 118, which includes a rationalized gain control (RGC) circuit 122, and image processing circuitry 124, which is preferably included in the processing system 102. The gain control and beamforming system 118 generates a table of digital intensity values that correspond to the strength of the ultrasonic return signals from the different portions of the interrogation region. These make up the compensated 2D envelope data for the scanned region. The system 118 also includes conventional filtering circuitry, for example, for dealiasing, reducing speckle, and amplitude compression, all of which will be applied before the RGC procedure according to the invention.

The input unit 100 preferably includes an RGC mode selector 125, which is preferably a push button, lever, key, or the like, that is connected to the processing system 102, in particular, to the gain control part of the processing system 118. By operating the mode selector, the user directs the system to enter either an RGC processing mode or an RGC idle mode, both of which are described below.

The interrogation region is normally not in the same shape as what the user wants to see displayed, and even when it is, the digital acoustic intensity values are normally not in a form suitable for driving a conventional gray-tone or color display directly. The acoustic intensity values are therefore applied to a conventional scan converter 126, which converts the digital acoustic values into display intensity or brightness values that are suitable for driving a display device 128. The display 128 is typically divided into a pattern of picture elements of "pixels" that make up an image that the user can view and interpret. Scan conversion and display are well-known features of an ultrasonic imaging system and are therefore not described further.

The invention also includes a memory 130, which contains portions for digitally storing the 2D envelope data table 131, RGC attenuation coefficients 132, and a TGC calibration table 134. These are explained in greater detail below.

Figure 2C:
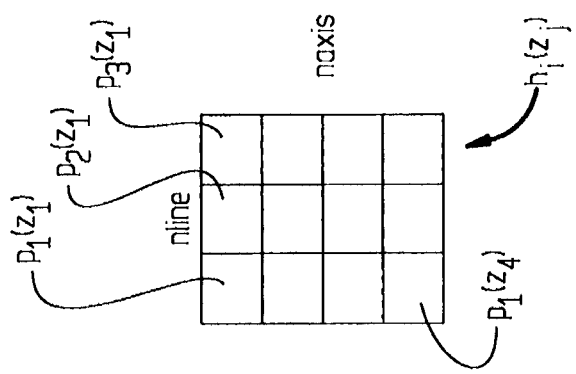
FIGS. 2a, 2b, and 2c illustrate a portion of an interrogation region in three levels of detail.
Figure 2B:
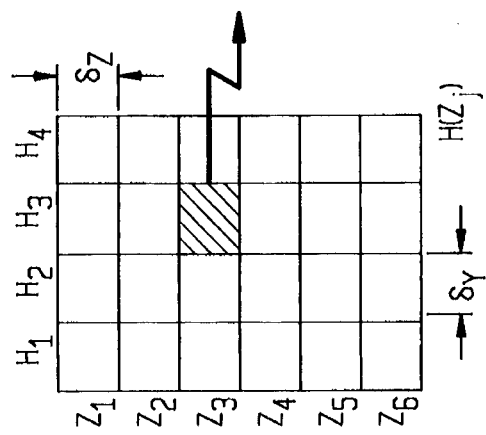
Figure 2A:
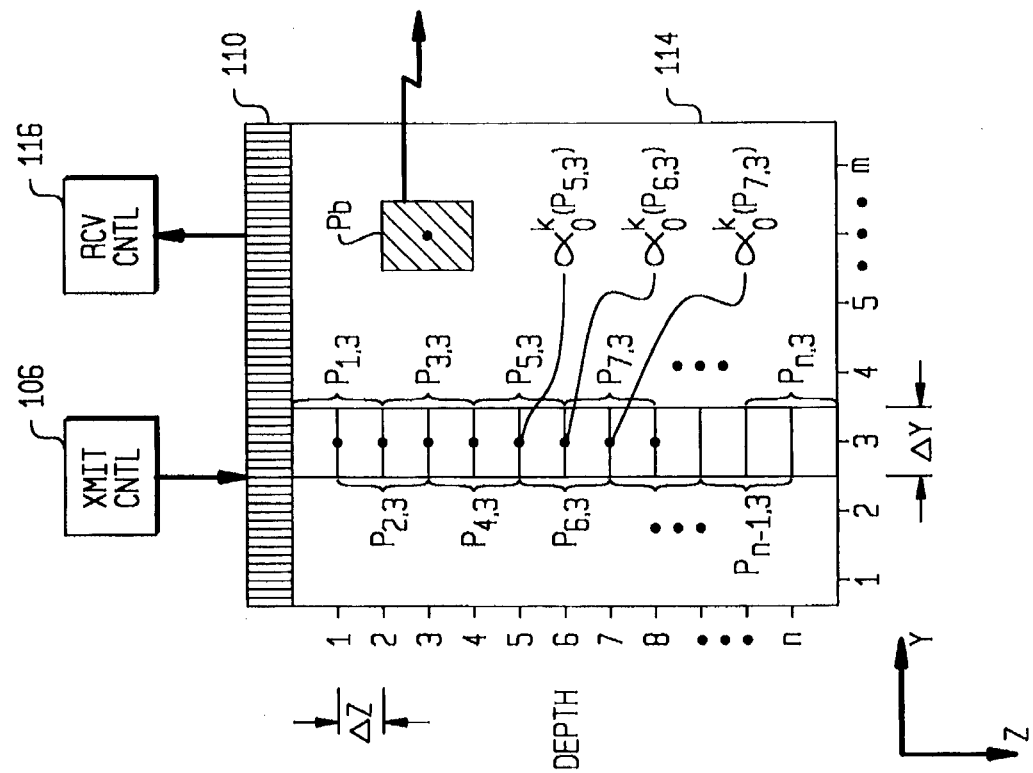

FIG. 2a shows the transmission control circuit 106, reception controller 116, and the array elements 110 together with a greatly enlarged representation of the interrogation region 114. A Y-Z axis is indicated to show the lateral direction and the axial or depth direction, respectively. According to the invention, the interrogation region 114 is imaged as a pattern of processing windows or blocks $P_{i,j}$, where i is the position of the window in the axial direction $1 \leq i \leq n$, and j is the position of the window in the lateral direction, $1 \leq i \leq n$. Notice that, according to the invention, the windows overlap in the depth direction, preferably by 50%. Each window preferably has the same structure.

As FIG. 2b illustrates, each processing window $P_b$ (b=i,j) consists of a plurality of processing groups distributed laterally as columns $II_1$, $II_2$, $II_3$, $II_4$, and in the depth direction as rows $Z_1$, $Z_2$, $Z_3$, $Z_4$, $Z_5$, $Z_6$. More or fewer rows and columns may be used to make up a window. For any given application, conventional simulation and experimentation will determine the optimal dimensions of a processing window for the purposes of efficient calculation of the values described below. Scanning and display to resolution, along with the available calculation speed and memory availability, will be among the factors used to determine the optimum dimensions.

Moreover, it is possible according to the invention for the processing windows to overlap in the lateral direction as well. This will in general not be necessary, since processing windows will typically be deeper than they are wide, but as long as the increased computational burden (described in greater detail below) does not increase unacceptably, then the method of the invention described below will be immediately adaptable to such lateral overlap.

As FIG. 2c illustrates, each processing group $II_i(Z_j)$ consists of a plurality of image elements $h_i(z_k)$, each of which has a corresponding power value $p_i(z_k)$ distributed laterally as nline columns and in the depth direction as naxis rows. Each column corresponds in width to a single scan and each row corresponds in depth to the smallest detectable time-distance segment of an echo signal.

For conventional ultrasound imaging systems, the value of each image element is the measured power of the backscattered signal from that element. Power is measured in any known manner from the electrical signals generated by the piezoelectric elements in the array.

As is conventional, the power values are stored in a memory circuit as a two-dimensional table referred to as "envelope data."

The group illustrated in FIG. 2c is three lines wide and four levels deep, that is, it has twelve elements. This is not necessary. As will become clearer below, the invention preferably includes several averaging steps, so enough elements should be included to provide an average without too great a variation. For one prototype of the invention, the inventor has determined that a group should be at least three scan lines, that is, elements, wide (nline ≥ 3). More or fewer rows and columns may be used to make up a cell. For any given application, conventional simulation and experimentation will determine the optimal dimensions of a processing window for the purposes of efficient calculation of the values described below.

In "Measurement of ultrasonic attenuation within regions selected from B-scan images," IEEE Trans. Biomed. Eng., BME-30, pp. 431–37, 1983, K. J. Parker and R. C. Waag demonstrated that, when the transmitted ultrasound energy is weakly focused and the echo samples are obtained from a region within the focal range, the power density S(f) of the echo can be expressed as:

$$S(f) = \frac{G(f)}{z^2} \cdot <Z(z)> \cdot e^{-4\alpha(f)z} \qquad \text{Equation 1}$$

where G(f) is the power density of the transmitted pulse, $<Z(z)>$ is the backscattering cross section of the scatterers at a distance z from the transducer, and $\alpha(f)$ is the attenuation function. For soft tissue, $\alpha(f)$ can be assumed to be a linear function of the frequency, that is, $\alpha(f) = \alpha_0 f$.

The power density of the transmitted pulse is also assumed to be at least approximately Gaussian, that is:

$$G(f) \simeq C_1 \cdot e^{-\frac{(f-f_c)^2}{2\sigma^2}} \qquad \text{Equation 2}$$

where $C_1$ is a constant and $f_c$ is the center frequency.

One can thus show that the mean power $\psi(z)$ of the echo that is backscattered by a resolution cell at distance z (here, depth) in the interrogation region can be expressed as:

$$\Psi(z) = C \cdot \frac{<Z(z)>}{z^2} \cdot e^{-4\alpha_0 z(f_c - 2\alpha_0 z \sigma^2)} \qquad \text{Equation 3}$$

where C is a constant. This shows that the echo mean power can be separated into two parts: 1) local (that is, position-dependent) attenuation (including beam spreading); and 2) the heterogeneity of the scatterers (including speckle). The problem is, one must know what the attenuation coefficient $\alpha_0$ is in order to be able to figure out depth-dependency from a knowledge of the mean power. The invention provides a method for determining this coefficient that does not need to make many of the limiting assumptions of known systems.

If the scatterers are completely homogeneous, then $<Z(z)>=Z$ and the change in the echo mean power is caused by local attenuation alone.

Figure 3:
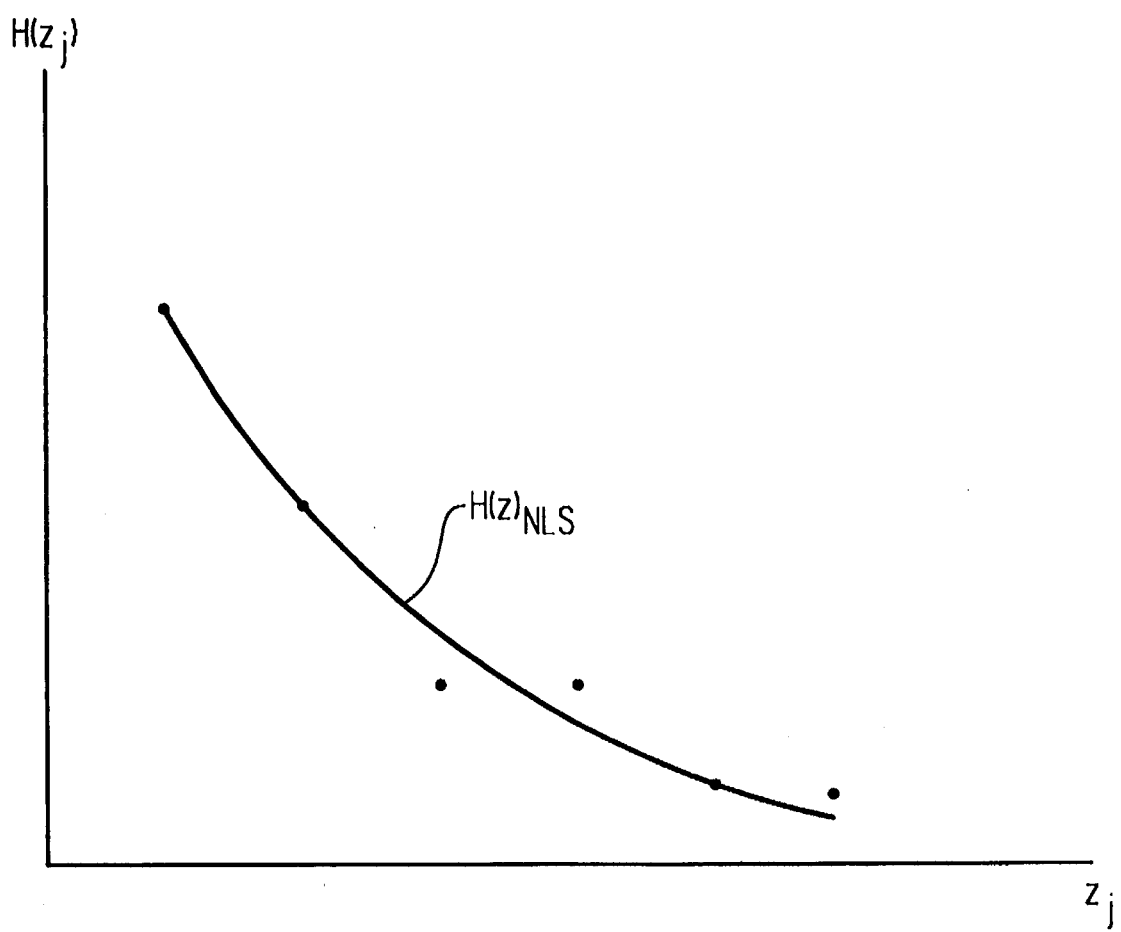
FIG. 3 illustrates a depth-dependent distribution of power values.

According to the invention, one determines the attenuation coefficient $\alpha_0$ by fitting a non-linear decay model to the sensed mean power for each processing window, an illustrative example of which is plotted as the curve in FIG. 3. The decay model used in the preferred embodiment of the invention is:

$$H(z) = a \cdot e^{-2\alpha_0 z(f_c - b\alpha_0^2 z)} \qquad \text{Equation 4}$$

where a is a constant. According to the preferred embodiment of the invention, the attenuation coefficient for each processing window is determined directly from a nonlinear least-squares (NLS) data fit of the sensed power-versus-position function, that is, of the values that are illustrated as data points in FIG. 3. In the invention, it is assumed that the beam-spreading term has already been calibrated before least-squares data fitting.

One should note that one difference between the method according to the invention and existing methods presented by P. He and Peters et al. is that the invention directly incorporates the frequency downshift term $f_d = 2\alpha_0 \sigma^2 z$.

As is mentioned above, the term $<Z(z)>$ will also contribute to the decay model if the scatterers are not homogeneous. P. He and Greenleaf attempted to use this fact to derive an indication of heterogeneity by comparing a computed signal-to-noise ratio (SNR) after attenuation gain with a theoretical SNR. This assumes, however, that one knows a good theoretical SNR in the first place. Indeed, this may be somewhat possible in controlled laboratory settings with skilled researchers, but it is hardly practical in most practical applications, where a sonographer examines different body regions of various impatient patients in a hospital. The invention provides a novel test for heterogeneity using the same procedure that determines the attenuation coefficients, and which requires no beforehand knowledge of the "noisiness" of the interrogation region.

Taking the logarithm of Equation 4 gives:

$$y_i = \ln H = \ln a - 2\alpha_0 f_c z + 4\alpha_0^2 \sigma^2 z^2 \qquad \text{Equation 5}$$

which can be written as a general data fitting model:

$$y_i = y(z_i; \ln a, \alpha_0)$$

The parameters ln a, $\alpha_0$ can be solved by minimizing the function F, defined as follows:

$$F = \sum_{i=1}^{N} [y_i - y(z_i; \ln a, \alpha_0)]^2 \qquad \text{Equation 6}$$

$$= \sum_{i=1}^{N} [\ln H_i - (\ln a - 2\alpha_0 f_c z_i + 4\alpha_0^2 \sigma^2 z_i^2)]^2$$

In order to reduce the effect of the uncertainties of the speckle noise in the decay model of Equation 7, it is preferable to average the sensed power along both the depth (Z) and lateral (Y) directions for each half-overlapped processing window (see FIG. 2a). Refer therefore once again to FIGS. 2a, 2b and 2c.

According to the invention, the values of all image elements for all groups in a row (at the same depth $Z_j$) for each processing window are averaged. Among other advantages of averaging is that it reduces the effect of speckle, which is the well-known phenomenon that signals are scattered by scanned structures that are smaller than the wavelength of the scanning signals. For example, cell walls are smaller than the wavelength of most ultrasound signals; the result is often small dark "spots," or "flecks"—that is, speckles—in the return image that have nothing to do with the structure of interest in the interrogation region.

Although weighted averaging may be used according to the invention, an unweighted average is preferred since it can be calculated faster and since there is in general no reason to assume any particular image element or group has any more information than any other. The averaging is preferably performed as a series of sub-steps for the sake of computational efficiency. Thus, a depth average $H(z_j)$ is determined as follows:

First, a row average (in the Y direction) is determined for each row of each independent beam:

$$h_i(z_k) = \frac{1}{nline} \cdot \sum_{j=1}^{nline} p_j(z_k) \qquad \text{Equation 7}$$

Second, a column average (in the Z direction) is determined from the naxis row averages:

$$h_i(z_j) = \frac{1}{naxis} \cdot \sum_{k=1}^{naxis} h_i(z_k) \qquad \text{Equation 8}$$

These two steps may of course be combined so that all the power values (which in the illustrated example, are twelve in number) in the group are averaged in a single step.

Third, a row average (in the Y direction) is determined for each entire processing window $P_b$ as follows:

$$H(z_j) = \frac{1}{group} \cdot \sum_{i=1}^{group} h_i(z_j) \qquad \text{Equation 9}$$

where group is the number of groups in each row of a processing window (in the example shown in FIG. 2b, group =4). For each processing window $P_b$, there will therefore be as many averaged power values $H(z_j)$ as there are rows in the window (in the example shown in FIG. 2b, there are six rows per window).

For each depth $z_j$, there is thus an averaged power value for each processing window. An illustrative example of the distribution of the power values for a processing window is plotted in FIG. 3. As the plot illustrates, and as one would assume, attenuation (that is, the gain) is position-dependent. If one can accurately determine this dependency, then one can accurately compensate for the loss of gain and better represent the scanned region. As a simplified example, assume that one knows that, at a given depth, the ultrasound signal is attenuated 50% compared to what it would be if the same structure were at the surface (depth=0). One would know to multiply the return signal value of the echo from that depth by two to get the "true" value.

It would be far too slow, however, using conventional processors, to attempt to estimate anew the position-dependent attenuation for the interrogation region each time an image is created (which, for real-time imaging, is on the order of tens of images per second). Furthermore, such computational effort would be wasteful and unnecessary, since the position-dependent attenuation properties of the interrogation region can in most practical cases be assumed to remain constant over many image cycles. Only when the user decides to scan a different region will it in general be advantageous to determine the new depth-dependency relationship. This is, however, a limitation imposed more by existing processor speeds than by any inherent property of this invention: the frequency of re-evaluation of the attenuation characteristics of the interrogation region will be determined by the available speed of the processing system that is incorporated into the system according to the invention.

Determining the attenuation/depth relationship for the scanned region is in practice the same as building an attenuation model of the region. The more accurate the model is, the better one will be able to apply appropriate correction to received signals and the better the displayed image will correspond to the actual acoustic properties of the scanned region. In short, the better one models attenuation, the better the image will be. As FIG. 3 illustrates, the attenuation function is typically nonlinear, which is in part a result of the frequency downshift (discussed above) being non-linear.

The problem of minimizing the function F defined above is a problem of non-linear least-squares minimization. According to the invention the preferred method for solving it (for ln a and $\alpha_0$) is the known Levenberg-Marquardt (LM) method. As is explained below in greater detail, once the attenuation coefficients $\alpha$ are determined for each processing window, they can be stored and applied for RGC of envelope data for on-going scans.

The LM method is an iterative method that takes an initial value and either converges to the optimal solution (true "convergence") or ultimately returns the initial value itself (non-convergence). According to the invention, two initial values are chosen for $\alpha_0$ representing a perturbation below and above the assumed solution, respectively. If the LM routine does converge on a true solution, then it does so from both above and below; if it does not, then it returns both initial values. The fact that both values are returned for non-convergence is used in the invention to test for heterogeneity of the interrogation region, as is described below. Since lna is not used for this heterogeneity test, only one initial value is preferably used to start the LM routine for it.

For the sake of simplicity, the optimization routine described below with main reference to $\alpha_0$. The NLS routine will, however, simultaneously solve for both variables.

The invention uses only $\alpha_0$ for error measurement in the decay model, (It must, however, be included in the NLS calculations since it is required for optimal data fitting.)

As with most other iterative methods, if the function to be minimized is properly conditioned and even has a minimum, then the LM method converges to the minimum. As is explained below, the invention takes the "reverse" approach and examines to what extent the minimization routine converges, and then uses this as a test for the heterogeneity of the tissue in the current processing window.

Using the LM minimization method for the function F, the homogeneity test proceeds according to the following steps:

1) Define a temporary attenuation coefficient $\alpha_0 = \alpha^{k-1}$ from the previous processing window. Also, define a temporary parameter $(lna)_0 = (lna)^{k-1}$ from the previous processing window 2) Set an initial first (or upper) solution and an initial second (or lower) solution as follows:

$\alpha_0^{(u)} = \eta \alpha_0$ and $\alpha_0^{(l)} = \xi \alpha_0$ where $\eta$ and $\xi$ are chosen so as to "bracket" the likely convergent solution. These factors may be chosen by normal experimentation and stored as parameters in the memory or can simply be set to provide an initial interval so large that one can be sure through experience and prior experimentation that it brackets convergent solutions. The inventor has determined through experimentation that an interval from 40% above to 40% below $\alpha_0$ is usually sufficient, that is, $\eta = 1.4$ and $\xi = 0.4$. Of course, as is well known, the larger the initial interval is, the longer it will normally take an iterative method such as LM to converge. It is not necessary for the initial perturbations $\eta$ and $\xi$ to be "symmetric", that is, the same percentage above and below $\alpha_0 = \alpha^{k-1}$, but doing so has the advantage that the initial interval can be defined more simply as:

$$\alpha_0^{(u)} = \alpha_0(1+\epsilon) \text{ and } \alpha_0^{(l)} = \alpha_0(1-\epsilon)$$

3) Run the LM routine to either convergence or nonconvergence for the $\alpha_0$. Convergence can be determined as follows. One advantage of the LM method for the purposes of the invention is that it produces an upper convergence value $\alpha_u^{(k)}$ and a lower convergence value $\alpha_l^{(k)}$. The optimum value $\alpha^{(k)}$, that is, the value of the attenuation constant $\alpha_0$ that minimizes the error of the non-linear least-squares (NLS) model, and thus that best models the depth-dependent decay in the NLS sense, is the average of the two convergence values:

$$\alpha^{(k)} = \frac{1}{2} \cdot (\alpha_u^{(k)} + \alpha_1^{(k)})$$

3a) If the NLS decay model is accurate, then the upper and lower convergence values will be very close to each other in value. ("Closeness" and thus convergence, are determined in the conventional manner by the difference being less than some predetermined, small threshold error value; alternatively, convergence of each value individually can be established when the value changes by less than a predetermined amount from one iteration to the next.) In other words, convergence is indicated if $\alpha_u^{(k)} \sim \alpha_{12}^{(k)}$, and $\alpha^{(k)}$ is set equal to either value (which is the same as setting it equal to the average, since they're the same value). The convergence value is then stored in the RGC attenuation table 132 (see FIG. 1) in a memory position associated with the processing window for which the coefficient has been determined.

3b) If the NLS decay model is not accurate, then the LM routine does not converge, and the final upper and lower convergence values remain approximately equal to their initial values, that is:

$$\alpha_u^{(k)} \sim \alpha_0^{(u)}; \alpha_1^{(k)} \sim \alpha^{(k)}; \text{ and } \alpha^{(k)} = \alpha_0 = \alpha^{(k-1)}$$

or, equivalently, for symmetric perturbations, $$\alpha_0^{(u)} = \alpha_0 \cdot (1+\epsilon) \text{ and } \alpha_0^{(1)} = \alpha_0 \cdot (1-\epsilon).$$

In this case, either an error or warning message can be issued to the user indicating non-convergence, or a predetermined flag or default value (for example, the TGC value) can be entered into the corresponding memory location to indicate to the processing system 118 that the system was not able to determine a reliable attenuation coefficient for the given processing window.

According to the invention, it is not necessary for the convergence to be "all or nothing;" rather, the invention provides a test for the degree of convergence, which is in most cases equivalent to a test for the degree of accuracy of the RGC procedure itself: Assume symmetric perturbation, that is choose $\eta = (1+\epsilon)$ and choose $\xi=(1-\epsilon)$. The RGC processor 122 then calculates a convergence factor $\zeta$ such that:

$$\zeta \equiv \frac{\alpha_u^{(k)} - \alpha_1^{(k)}}{0.5(\alpha_u^{(k)} + \alpha_1^{(k)})} \qquad \text{Equation 10}$$

Note that $0 \leq \zeta \leq 2\epsilon$ using the LM routine. When $\zeta=2\epsilon$, then there is no convergence. According to the invention, one therefore pre-selects a threshold constant c that is, for example 80% of $2\epsilon$ (the actual amount in any given application will be determined using conventional experimentation) and then flags non-convergence if $\zeta > c$.

See FIG. 3. The LM routine for carrying out the NLS data fitting step determines the estimate $\alpha_0^{(k)}$ of the attenuation coefficient for the non-linear decay model that best approximates in the NLS sense the averaged sensed power values for each respective processing window. As Equation 4 shows, once the coefficient $\alpha_0^{(k)}$ is known ($f_c$ and $\sigma^2$ are known from the known characteristics of the transmission pulse), the decay function is also known. In the illustration shown in FIG. 3, this means that once $\alpha_0^{(k)}$ is determined based on the values of the data points, then the system also has determined the curve $H(z)_{NLS}$ that best represents the depth-dependency of the respective processing window. By storing the single coefficient for that window, the system can determine—and compensate for—the attenuation not only at the discrete depths for which data points were obtained (through averaging according to Equations 7–9), but also for all intermediate points.

The LM routine for determining an NLS optimum has the advantage that it is very stable and converges well for data-fitting, that is, NLS functional approximation, of received ultrasound echo power values. It also has the advantage of converging quickly from both above and below, so that the convergence and heterogeneity test described above is easily implemented. Other known optimization routines may, however, also be used to solve the NLS optimization for the non-linear decay model used in the invention. A gradient descent or Newton-Raphson based method, for example, could also be used, in which case one test for non-convergence could be that the difference between a subsequent iteration and its immediately preceding iteration is still greater than a predetermined threshold value.

According to the invention, the RGC processor 122 calculates an NLS attenuation coefficient $\alpha_0^{(k)}$ for each processing window in the interrogation region and associates it with the center of the respective window. This is illustrated in FIG. 2a, in which the coefficients $\alpha_0^{(k)}(P_{5,3})$, $\alpha_0^{(k)}(P_{6,3})$, and $\alpha_0^{(k)}(P_{7,3})$ are indicated as "dots" at the center of the respective processing windows P(5,3), P(6,3), and P(7,3). Coefficients are similarly associated with the other processing windows in the interrogation region, not only for those in illustrated column 3, but also for all other processing windows in the other columns and rows. The overlapping of the processing windows has the advantage that the distance between coefficients ("dots") is decreased, which increases the accuracy of the interpolation steps described below.

Note that the attenuation characteristics that the invention determines are more correctly referred to as being position-dependent (that is, "local") than depth-dependent, since depth only in part—albeit a large part—contributes to the distance from the transducer of most of the image elements in the interrogation region. Consequently, the attenuation coefficients will typically be different even for adjacent processing windows at the same "depth" in the Z direction.

According to the invention, the attenuation coefficients are stored in the image processor 124 or in the RGC attenuation table 132 in the memory 130. The 2-D attenuation table is then used to apply lateral and axial compensation corrections to the received echo power values.

Assume now that the system needs to compensate for depth-dependent or a scanned resolution cell at depth z* from column i, whose envelope value is stored in the table 131. One way to calculate the needed compensation factor would be to retrieve the coefficient for the corresponding processing window, and enter it and z* into the decay model (Equation 4) for each value as it is received. This would, however, require considerable redundant computational effort, with several multiplications and an exponential function.

Yet another alternative would be to precalculate the compensation factor for every resolution cell and store RGC attenuation table 132 before actually applying the RGC to continued real-time scanning of the interrogation region. This guarantees that the compensation factor will exactly correspond to the decay model, and it requires only one pass to calculate the entire table, but it does involve evaluation of the decay model for a large number of cells.

The preferred method according to the invention is to linearly interpolate the gain compensation values both laterally (Y direction) and axially (Z direction) between the computed points (the "dots" at the center of the processing windows). The interpolated values are then stored as the 2-D RGC gain table 132. The values in the 2-D RGC gain table are then used to apply lateral and axial compensation corrections to the received echo power values. If the decay model values (possibly interpolated) are stored, then the system will divide each sensed power value by the corresponding table value to get the compensated value that is passed on for scan conversion and display. Alternatively, the inverse of the decay model values can be stored, so that the RGC table contains the gain values by which sensed values are to be multiplied. The inventor has determined that linear interpolation of the correction factor for points between the center points of the processing windows (whose values are determined by averaging and NLS approximation of the non-linear decay model) provides satisfactory accuracy for ultrasonic scanning using conventional equipment. Note that "tighter" "non-linear" attenuation coefficients can be obtained by increasing the degree of overlap of adjacent processing windows.

Figure 4:
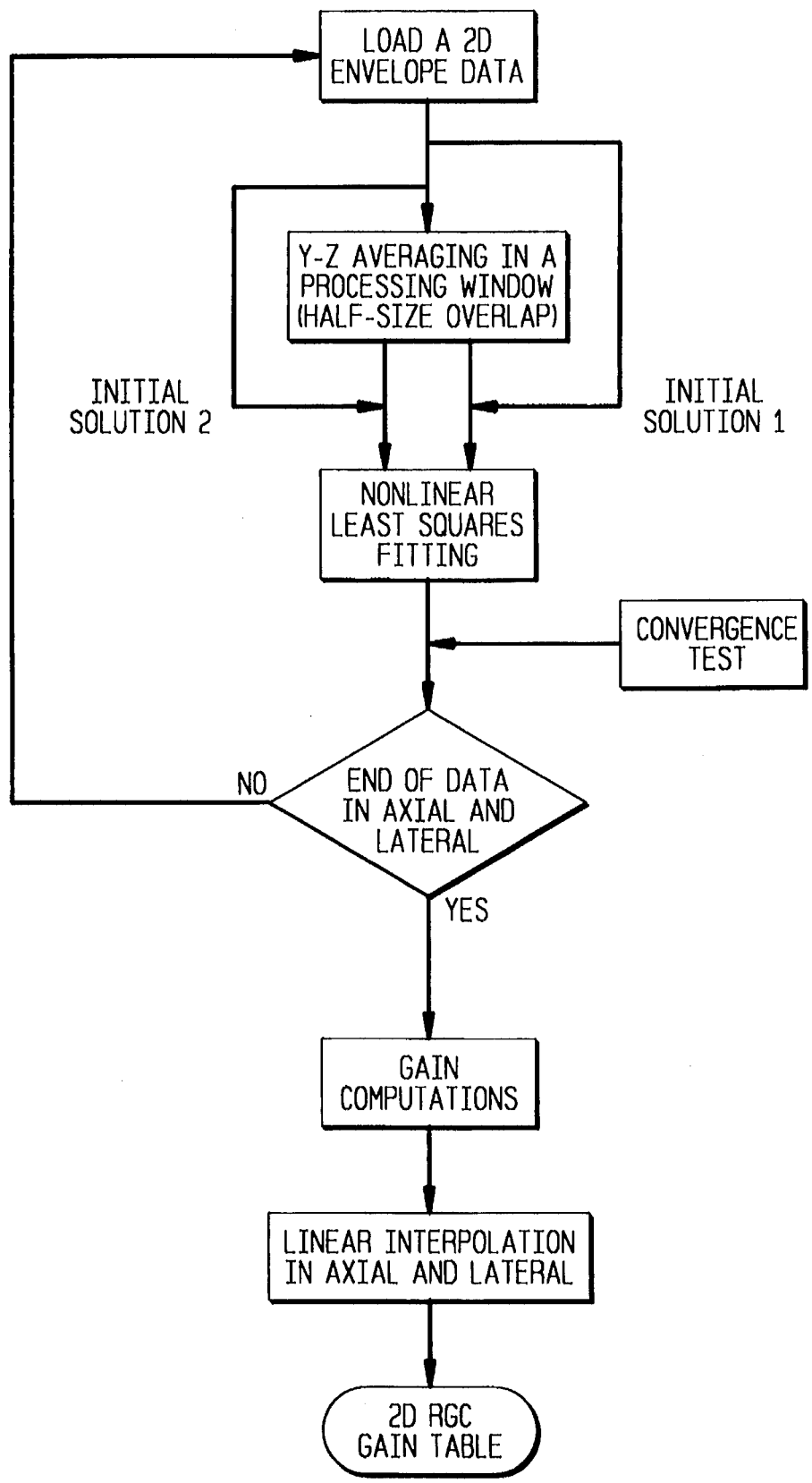
FIG. 4 is a flow-chart that shows the main steps involved in the RGC system according to the invention.

FIG. 4 is a flow chart that illustrates the main steps of the RGC method according to the invention. Note that it is assumed that the beam diffraction and other system effects, for example, known non-linear compression, should be calibrated and applied to the envelope data entered into the RGC processing system 122, which carries out the various steps shown in FIG. 4. This ensures that the RGC system operates on power values that are as "pure" as possible, that is, only affected by position-dependent attenuation.

During a typical ultrasonic scan of a patient, the system will generate hundreds and often thousands of images for each interrogation region. It is therefore usually not necessary to calculate the RGC attenuation correction table more than once per region, or perhaps only a few times. For almost all the scan, the operator is interested only in seeing the gain-compensated images. The ultrasound system according to the invention therefore operates in two "modes": an RGC processing mode and an RGC idle mode.

The user enters the RGC processing mode by activating the mode switch 125, for example, at the beginning of a scan of a new region, the probe is moved, a new probe is used, the system parameters such as the focusing geometry are changed, or some other event occurs that leads the user to suspect that improved gain compensation may be necessary. A conventional TGC calibration table 134 should be stored before applying the RGC procedure according to the invention. In the RGC processing mode, the initial user gain control (the TGC parameters entered manually by the user via the input device, as well as any fixed gain ramps preprogrammed into the system) is enabled in order to provide information with sufficient dynamic range. The transmission processing system 104, 106 then directs a scan of the interrogation region. The received signals will then be calibrated by using the TGC calibration table and the beam diffraction correction table 121 and to have data that is suitable for RGC processing.

The reception controller 116 and RGC processor (together with the image processor 124) then calculates the RGC attenuation coefficients and store them in the 2-D RGC attenuation table 132 as described above. These RGC values are also used to compensate the attenuation effect of the envelope data, which, after compensation, are applied to the scan converter 126 for display.

Once the system according to the invention has completed the steps in the processing mode (which may be signalled in any suitable manner, for example, on the display 128), then the system switches into the idle mode. The term "idle" refers to the activities of the RGC processing system. In the idle mode, the 2-D table of RGC attenuation factors (including those that have been interpolated) will then be continuously applied (preferably, by the image processor 124) as run-time attenuation factors to the envelope data, which need not be further processed by the RGC processor.

The primary reason for having an idle mode separate from the processing mode in the example of the invention described above is to save the time it would take to do the RGC calculations for every new image to be generated. This two-mode operation is, however, not necessary as long as a sufficiently fast processor is available.

The invention has been described with reference to an exponential decay model (Equation 4). This is preferred since experiments indicate that such a model best approximates the depth-dependent attenuation of tissue scanned using known ultrasonic imaging devices, but it is not necessary. As long as a suitably convergent optimization routine is chosen (LM or some other) to determine the attenuation coefficients, then the invention can be applied to advantage even for other non-linear decay models.

Furthermore, the invention has been described above in the context of actual gain control. However, the invention provides a way of determining position-dependent attenuation of tissue scanned by ultrasound whether the attenuation profile is used for image improvement or not. For example, in a system that is designed to display or study attenuation properties in their own right, the actual gain control features of the invention will not be necessary. The invention encompasses such uses as well.

I claim:

1. A method for determining local attenuation of an interrogation region scanned by an ultrasonic imaging system comprising the following steps:

A. scanning by ultrasound an interrogation region in an axial direction and a lateral direction;

B. sensing backscattered ultrasonic echoes from the interrogation region;

C. grouping the backscattered echoes as a two-dimensional pattern of image elements;

D. generating a two-dimensional table of envelope power values corresponding to a plurality of rows and columns of the pattern of image elements; and E. in a processing mode:

1) grouping the image elements in the interrogation region into a two-dimensional pattern of processing windows, each window being divided into window rows that extend in the lateral direction and window columns that extend in the axial direction;

2) for each window row of each processing window, generating an average positional power value;

3) generating a window attenuation coefficient corresponding to a decay parameter of a non-linear decay model of local attenuation of the interrogation region as a non-linear function of the average positional power values for each row in the processing window.

2. A method as in claim 1, further including the following steps:

A. scaling each envelope power value by a run-time attenuation value that is a predetermined function of the window attenuation coefficient for the corresponding processing window; and B. displaying the scaled envelope power values.

3. A method as in claim 2, in which:

A. in the processing mode, the generated window attenuation coefficients are stored in an attenuation table portion of a memory; and B. the step of scaling is carried out in an idle mode, during which the stored attenuation coefficients are applied to run-time scanned power values of different scanned images of the interrogation region.

4. A method as in claim 2, in which the processing windows overlap in the axial direction.

5. A method as in claim 2, in which the step of generating the window attenuation coefficients includes the following steps:

A. defining a convergence criterion and a nonconvergence criterion;

B. iteratively estimating the window attenuation coefficient until one criterion is met; and C. indicating heterogeneity of tissue in the corresponding processing window of the interrogation when the nonconvergence criterion is met.

6. A system for determining local attenuation of an interrogation region scanned by an ultrasonic imaging system comprising:

A. an ultrasonic transmission means for scanning by ultrasound an interrogation region in an axial direction and a lateral direction;

B. an ultrasonic reception means:

1) for sensing backscattered ultrasonic echoes from the interrogation region;

2) for grouping the backscattered echoes as a two-dimensional pattern of image elements;

3) for generating and storing in a memory a two-dimensional table of envelope power values corresponding to a plurality of rows and columns of the pattern of image elements; and 4) in a processing mode:

a) for grouping the image elements in the interrogation region into a two-dimensional pattern of processing windows, each window being divided into window rows that extend in the lateral direction and window columns that extend in the axial direction;

b) for each window row of each processing window, for generating an average positional power value;

c) for generating a window attenuation coefficient corresponding to a decay parameter of a nonlinear decay model of local attenuation of the interrogation region as a non-linear function of the average positional power values for each row in the processing window.

7. A system as in claim 6, further including:

A. rationalized gain control (RGC) means for scaling each envelope power value by a run-time attenuation value that is a predetermined function of the window attenuation coefficient for the corresponding processing window; and B. display means for displaying the scaled envelope power values.

8. A system as in claim 7, in which:

A. in the processing mode, the generated window attenuation coefficients are stored in an attenuation table portion of the memory;

B. the RGC means has an idle mode separate from the processing mode, the RGC means being further provided for applying, in the idle mode, the attenuation coefficients to run-time scanned power values of different scanned images of the interrogation region.

* * * * *